US012718805B2

(12) United States Patent
Lee et al.

(10) Patent No.: US 12,718,805 B2
(45) Date of Patent: Aug. 25, 2026

(54) FOLLOW-UP QUERIES FOR LARGE LANGUAGE MODELS DURING VIRTUAL CONFERENCES

(71) Applicant: Zoom Video Communications, Inc., San Jose, CA (US)

(72) Inventors: Bilung Lee, Irvine, CA (US); Renjie Tao, Santa Clara, CA (US); Yun Zhang, Pittsburgh, PA (US)

(73) Assignee: Zoom Communications, Inc., San Jose, CA (US)

( * ) Notice: Subject to any disclaimer, the term of this patent is extended or adjusted under 35 U.S.C. 154(b) by 78 days.

(21) Appl. No.: 18/384,213

(22) Filed: Oct. 26, 2023

(65) Prior Publication Data

US 2025/0140244 A1 May 1, 2025

(51) Int. Cl.
*G10L 15/183* (2013.01)
*G06F 16/242* (2019.01)
*G10L 15/18* (2013.01)
*G10L 15/22* (2006.01)
*G10L 15/30* (2013.01)

(52) U.S. Cl.
CPC .......... *G10L 15/183* (2013.01); *G06F 16/243* (2019.01); *G10L 15/1815* (2013.01); *G10L 15/22* (2013.01); *G10L 15/30* (2013.01)

(58) Field of Classification Search
CPC ... G10L 15/183; G10L 15/1815; G10L 15/22; G10L 15/30; G06F 16/243; G06F 16/3329; H04L 12/1831
See application file for complete search history.

(56) References Cited

U.S. PATENT DOCUMENTS

2014/0244252 A1* 8/2014 Dines .................. H04M 7/0027 704/235
2020/0065420 A1* 2/2020 Scodary .............. G06F 16/9535
2021/0248376 A1* 8/2021 Zhao ........................ G06N 3/08
2023/0115098 A1 4/2023 Miller et al.
2023/0350929 A1* 11/2023 Hasan .................... G06N 5/022
2024/0354436 A1* 10/2024 Mukherjee .......... G06F 16/3344
2024/0370509 A1* 11/2024 Guillon ............... G06F 16/3338
2025/0117814 A1* 4/2025 Bennett .............. G06Q 30/0627

FOREIGN PATENT DOCUMENTS

WO WO-2024264056 A1 * 12/2024 ........... G06F 16/953
WO WO-2025090062 A1 * 5/2025 ........... G06N 3/0455

OTHER PUBLICATIONS

International Search Report & Written Opinion for PCT/US2024/046581 mailed Dec. 17, 2024.
Zhong et al., "QMSum: A New Benchmark for Query-based Multi-domain Meeting Summarization", arxiv.org, Cornell University Library, Ithaca, New York, Apr. 13, 2021; pp. 1-17.

* cited by examiner

*Primary Examiner* — Abul K Azad
(74) *Attorney, Agent, or Firm* — Kilpatrick Townsend & Stockton LLP

(57) ABSTRACT

One example method includes joining, by a client application executed by a client device, a virtual conference hosted by a virtual conference provider, a plurality of participants attending the virtual conference; receiving, by the client application, a question associated with the virtual conference; generating a query context based on a real-time transcript of the virtual conference; providing the query context and the question to a trained large language model ("LLM"); and receiving a response from the LLM based on the question and the query context.

20 Claims, 11 Drawing Sheets

FOLLOW-UP QUERIES FOR LARGE LANGUAGE MODELS DURING VIRTUAL CONFERENCES

FIELD

The present application generally relates to virtual conferencing, and more specifically relates to follow-up queries for large language models ("LLMs") during virtual conferences.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
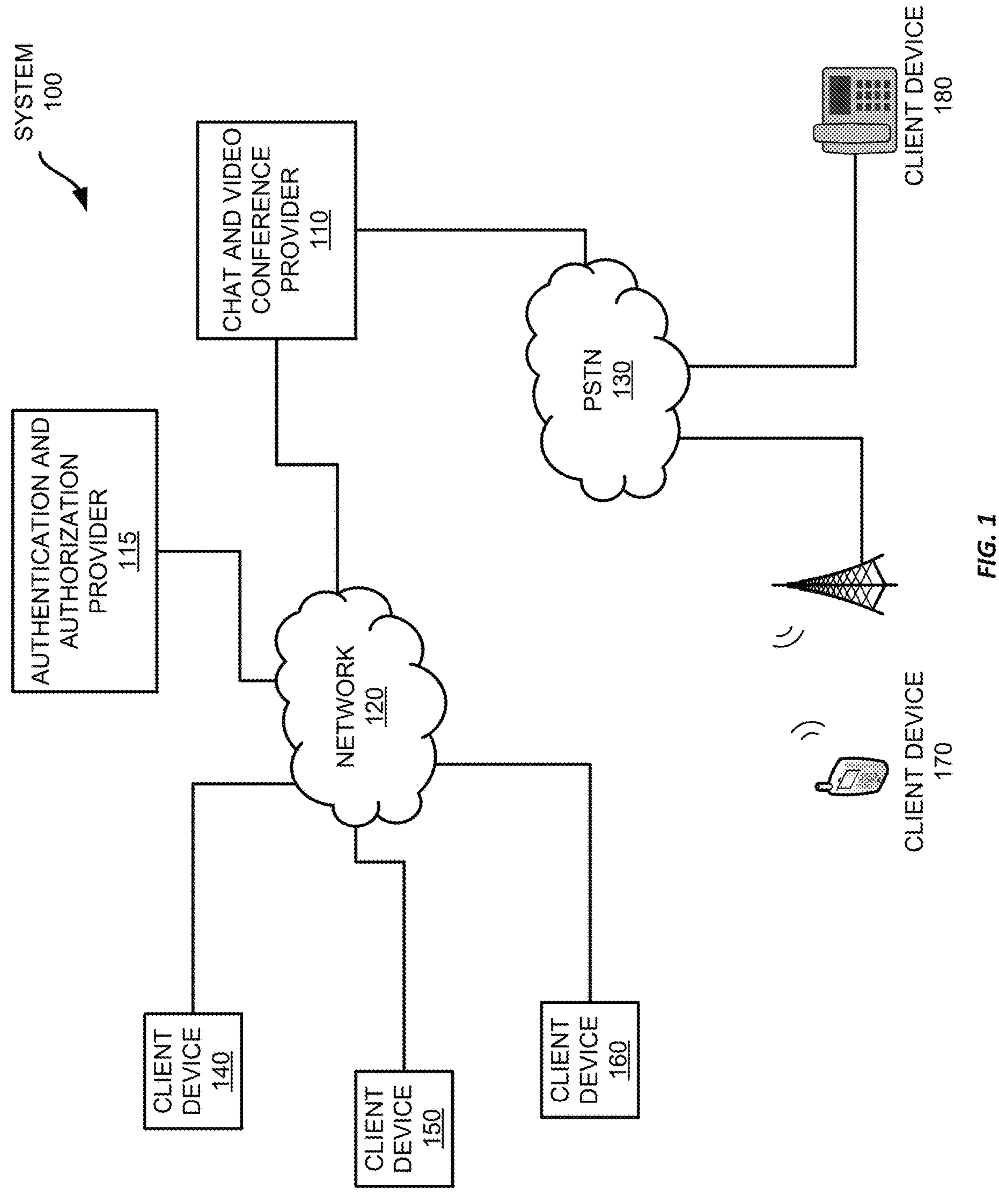
FIGS. 1-2 show example systems for follow-up queries for LLMs during virtual conferences.

Examples are described herein in the context of follow-up queries for large language models ("LLMs") during virtual conferences. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

During a virtual conference, participants may engage in discussions about a variety of topics over an extended period of time. In some instances, a participant may be distracted or otherwise shift their attention from the discussion to other matters. However, when they re-engage with the conference, they may have questions about what has transpired in the interim. While they could simply ask other participants, it may be disruptive and may signal that they have not been paying attention. Instead, the participant can make use of an artificial intelligence ("AI") assistant to provide information about the meeting in real-time during the meeting.

To use the AI assistant, the participant can interact with client software used to join and participant in the meeting. The participant can select an option to initiate the AI assistant, at which time they may be provided with a query panel to enable interaction with the AI assistant. The participant can then type queries into the chat panel to obtain AI assistance. The AI assistant may then employ a LLM to handle the query by providing the query and a real-time transcript of the conference. The LLM can receive the information as input and generate a response.

A difficulty with such techniques, however, is that LLMs typically have constraints on inputs to the LLM. For example, LLMs typically have a character limit on input strings, such as 4,000 characters. For queries directed to transcripts generated during a virtual conference, the transcript itself may easily exceed the 4,000 character limit. In addition, a user may have one or more follow-up queries to their initial query. And typically, LLMs do not carry context from one query to the next. Thus, if a user asks a follow-up questions, such as "tell me more about that," the LLM will not understand what the query is referring to.

To address these issues and provide the ability to query lengthy conference transcripts, during the conference, and to enable a user to ask follow-up queries to their initial question, an example AI assistant may maintain a query history of queries and responses received from the LLM. Whenever a user provides a new question, the AI assistant can determine whether the question appears to be related to a previous query, either syntactically (e.g., based on using one or more of the same keywords) or semantically. If a relationship is identified, information about the prior query may then be obtained, such as the query itself and the response. In some cases, a context (described in more detail below) associated with the prior query may be obtained as well.

The AI assistant then generates embeddings for the transcript generated by the virtual conference provider, the prior query information, and the new question. The embeddings may then be compared and relevant information may be provided as a "context," which includes the relevant parts of the transcript. A query submission is then generated that includes the context, the new question from the participant, and the related prior query (or queries). The query submission is then provided to the LLM, which can generate a response for the participant.

By using these techniques, the size of the input provided to the LLM can be reduced by generating and using the context rather than the full transcript. In addition, by identifying related prior queries and responses, the LLM can be provide with contextual information that can be used to provide a high quality response to the follow-up query.

This illustrative example is given to introduce the reader to the general subject matter discussed herein and the disclosure is not limited to this example. The following sections describe various additional non-limiting examples and examples of follow-up queries for large language models ("LLMs") during virtual conferences.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
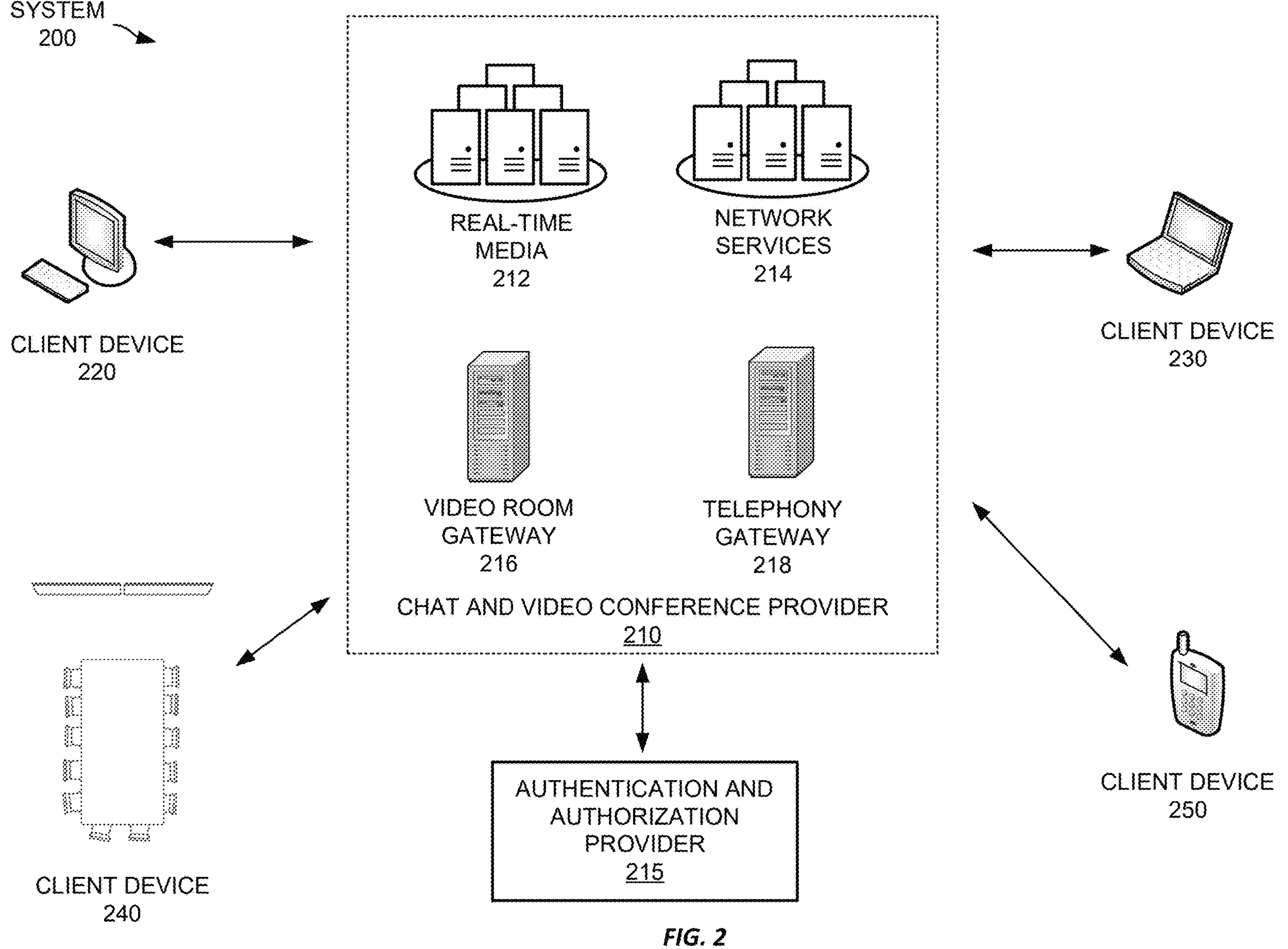

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O) as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
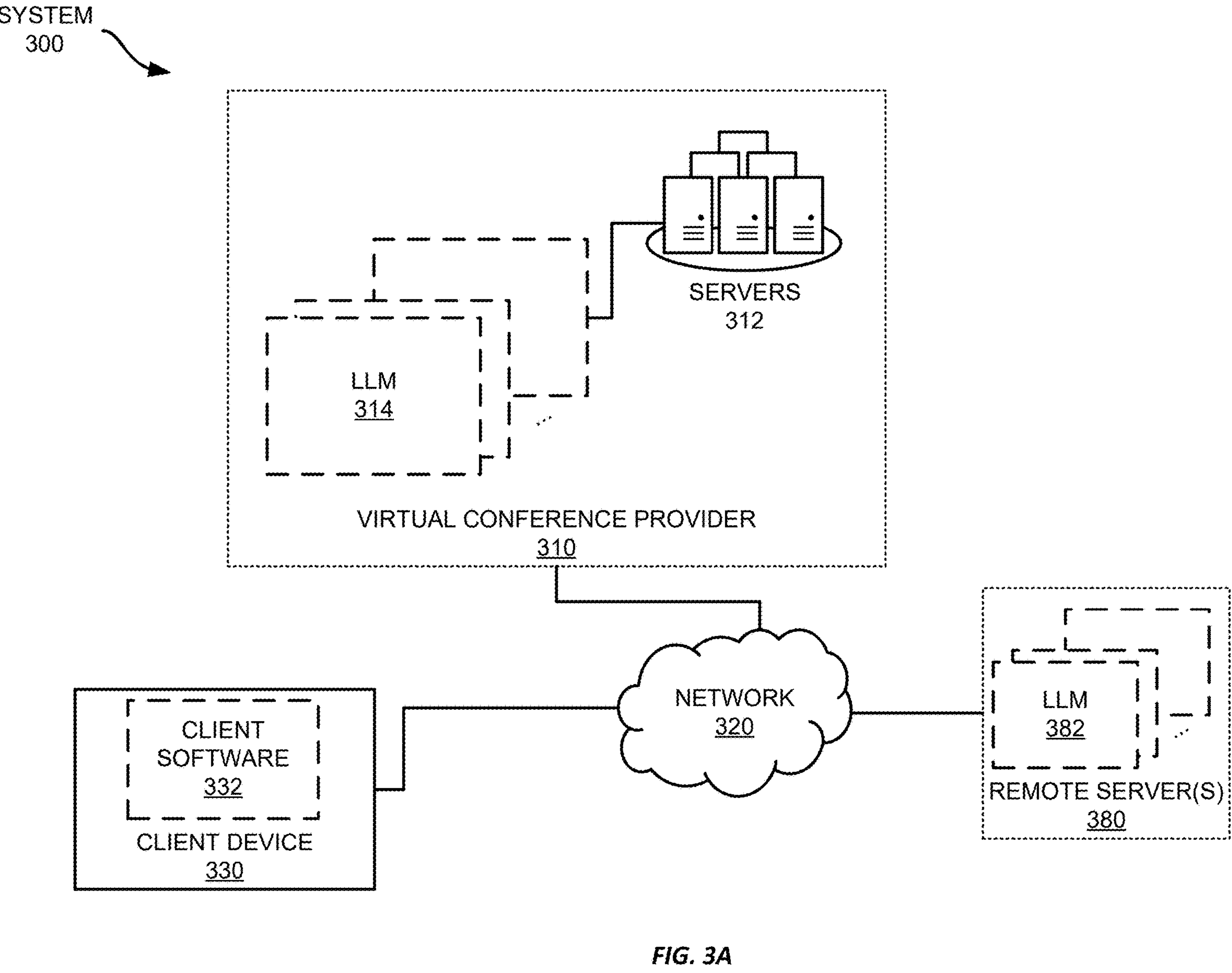
FIGS. 3A-3B show an example system for follow-up queries for LLMs during virtual conferences.

Referring now to FIG. 3A, FIG. 3A shows an example system 300 for follow-up queries for LLMs during virtual conferences. In this example, the system 300 includes a client device 330, a virtual conference provider 310, and one or more remote servers 380 that host one or more LLMs 382. In this example, the virtual conference provider 310 provides virtual conferencing capabilities, such as discussed above with respect to FIGS. 1-2, but also provides one or more servers 312 that provide one or more LLMs 314 that may be used to service requests received from users via their respective client device, such as client device 330.

The LLM 314 may be a model that has been trained on a large corpus of data, such as information available from licensed, commercially usable, non-public datasets. For LLMs, the training data may be written materials, such as webpages, documents, emails, or blogs that may be relevant to generating written works.

Client devices may execute client software 382 to join and participate in virtual conferences hosted by the virtual conference provider 310. During a virtual conference, the participants can exchange audio and video streams, as discussed above with respect to FIGS. 1-2, to interact with each other, discuss any topics of interest, and share content. However, during a virtual conference (or "meeting"), a participant may have questions about what has transpired during the meeting. For example, the participant may have been distracted or had to step away from the meeting for a period of time. Thus, when the participant re-engages with the meeting, they may wish to obtain information about things said during the meeting, a brief summary of a portion of the meeting, a summary of comments from a particular user, and so forth.

To do so, the participant can interact with the client software to pose questions to a LLM 314, 382, such as via a graphical user interface ("GUI") provided by the client software 332. The queries may include a question from the user as well as other information, such as a portion or all of a transcript of the meeting (up to that point of the meeting) and one or more prior queries and responses.

To query an LLM 314, 382, a user of the client device 330 may interact with client software 332 by typing in or speaking a question for the LLM 314, 382. Before it is sent to the LLM 314, 382, however, the client software 382 obtains the transcript for the meeting from the virtual conference provider 310 and provides it along with the question as a query. However, because the LLM 314, 382 may have a limit on the size of an input, e.g., 4,000 characters, it may not be possible to provide the entire transcript as well as the question or other contextual information. Thus, the client software 332 employs techniques to reduce the size of the query. In addition, to improve the quality of the response to the query, the client software may generate contextual information to be included with the question, such as based on past queries and responses stored in a query history.

Once the query has been generated, however, it may be transmitted to the LLM 314, 382, which generates a response and provides it to the client software 332. The client software 332 presents the response to the participant within the GUI. In addition, the client software 332 stores the query and associated response in the query history. By using such a process, the system can receive questions from the user, generate queries based on those questions using additional contextual information to allow the LLM 314, 382 to provide more useful responses to the participant.

Figure 3B:
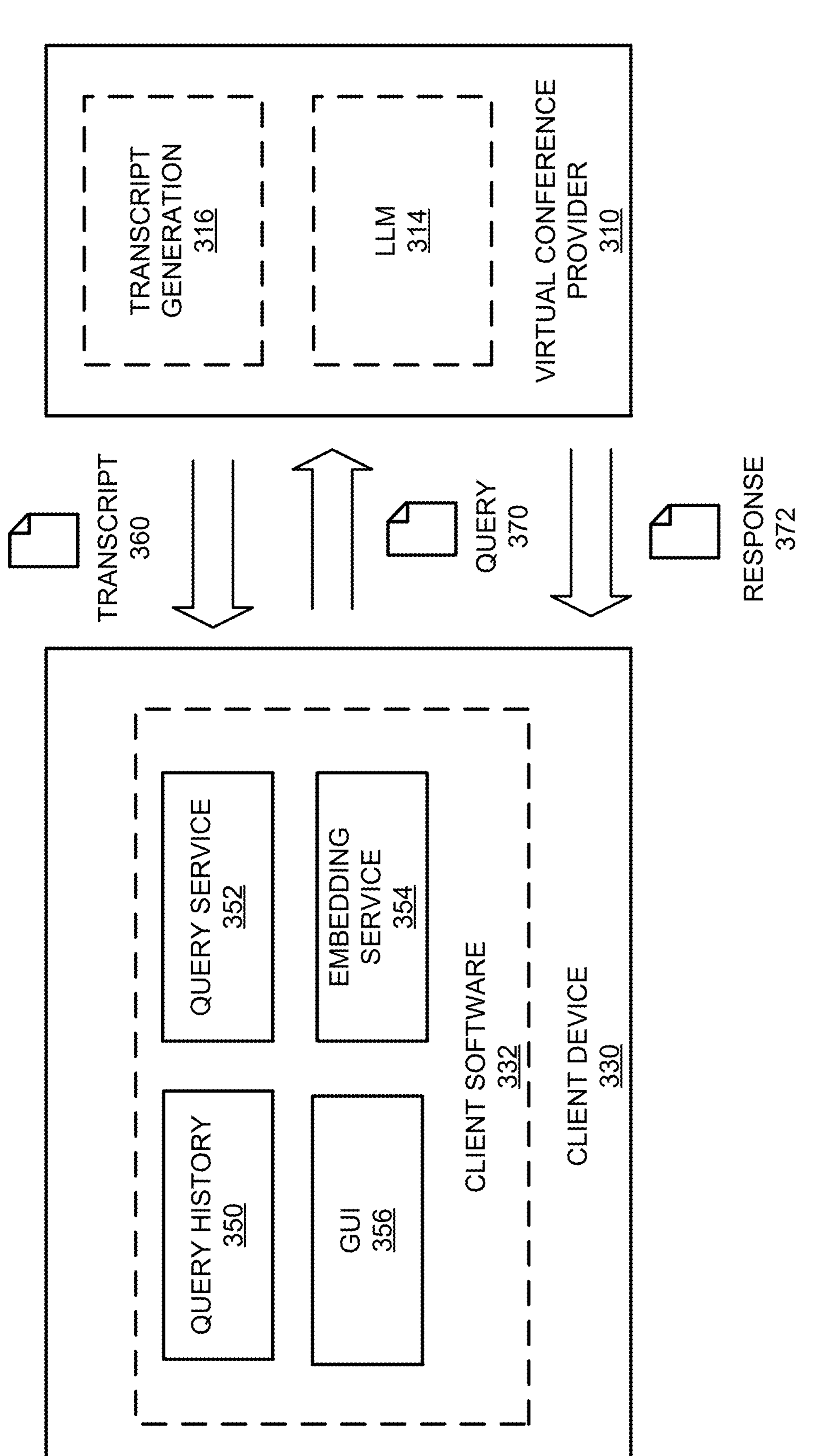

Referring now to FIG. 3B, FIG. 3B shows a more detailed view of the client device 330 and virtual conference provider 310 from FIG. 3A. The client device 330 executes client software 332 that allows a user to engage in meetings hosted by the virtual conference provider 310. As discussed above, during a meeting, the user may submit queries 370 to an LLM 314 hosted by the virtual conference provider 310, which can process the query 370 and provide a response 372 to the client software 332, which then displays it to the user within the GUI 356.

To enable such query functionality, the virtual conference provider 310 provides a transcript generation service 316. During a meeting, the virtual conference provider 310 receives and transmits audio and video streams from the different client devices that are connected to the meeting as discussed above with respect to FIGS. 1-2. Because the virtual conference provider 310 receives the audio streams, if requested and consented to by the participants in the meeting, it can generate a transcript of the meeting in real-time using the transcript generation service, which employs automatic speech recognition ("ASR") on the received audio streams. The transcript is maintained by the virtual conference provider 310 and is accessible by the participants during and after the meeting.

To enable query generation, the client software 332 provides a panel within the GUI 356 to allow the user to enter questions for the LLM 314 and receive the corresponding responses. When a user enters a question into the GUI 356, the question is sent to the query service 352, which begins constructing a query for the LLM 314. The query service requests and receives a current transcript 360 from the virtual conference provider 310. It then accesses the query history to obtain any prior queries and corresponding responses. It then attempts to identify whether any prior queries or responses are related to the question, syntactically or semantically. A prior query is syntactically related to the current question related if the question from the prior query includes one or more common keywords with the current question, e.g., a name, a topic, or a common phrase. Syntactic relationships may be based on text comparisons, e.g., via regular expression searches or keyword matches. A prior query is semantically related to the current question if they are related to the same topic, information, or other semantic content. Semantic (or syntactic) relationships may be determined based on use of a trained AI model, e.g., a deep-learning classifier with labels of current or prior questions. Some examples may employ an LLM to perform such syntactic or semantic analysis. It then provides the transcript 360 and at least one of the question or the prior queries and responses (if any were identified) to the embedding service 354, which employs an AI model, such as a neural network, to generate embeddings and to identify which parts of the transcript are relevant to the question and, if any were provided, prior queries and responses.

Based on the output of the embedding service, the client software 332 generates a query that includes the question, the transcript, as well as one or more prior queries and responses that are related to the question, if any were identified. The discussion below with respect to FIGS. 5-8 provide a more detailed description of how queries are generated in different scenarios. Because the query is supplied with contextual information as an embedding, the size of the query may be substantially smaller than if the plain text of the transcript was provided along with the question and any related prior queries. Further, any or all of these components of the query may be provided as an embedding according to different examples.

Once the query has been assembled, it is transmitted to the virtual conference provider 310, which provides it to the LLM 314. The LLM 314 then generates a response, which is transmitted by to the client software 332 and displayed within the GUI 356. In addition, the query and response are stored in the query history 350.

It should be appreciated that while the LLM 314 in this example is hosted by the virtual conference provider 310, examples may employ LLMs 382 hosted by other remote services, such as those maintained by third parties.

Figure 4:
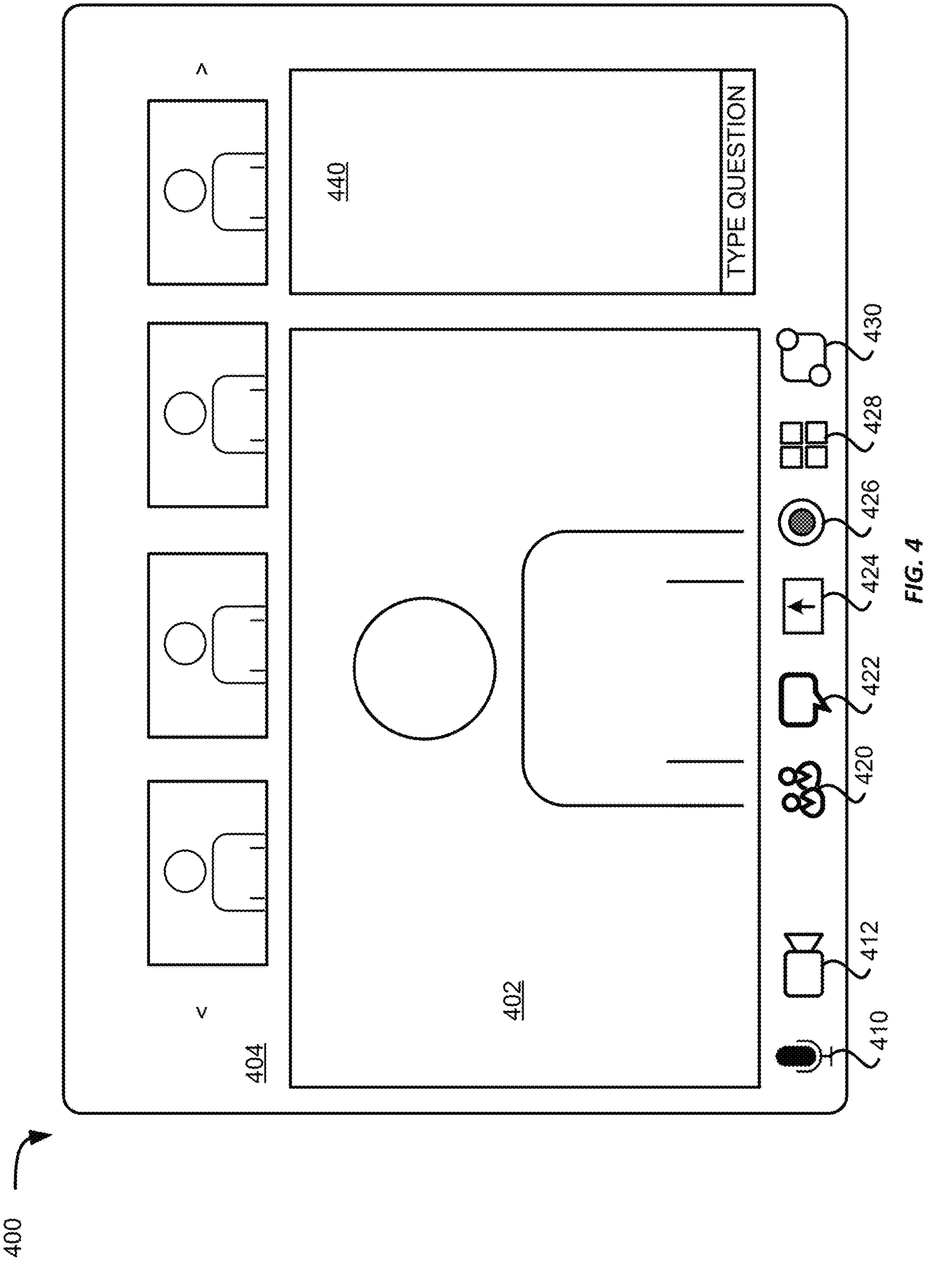
FIG. 4 shows an example graphical user interface suitable for use with example systems and methods for follow-up queries for LLMs during virtual conferences.

Referring now to FIG. 4, FIG. 4 shows an example GUI 400 suitable for use with systems and methods for follow-up queries for LLMs during virtual conferences. A client device, e.g., client device 330, executes client software 332 as discussed above, which in turn displays the GUI 400 on the client device's display. In this example, the GUI 400 includes a speaker view window 402 that presents the current speaker in the video conference. Above the speaker view window 402 are smaller participant windows 404, which allow the participant to view some of the other participants in the video conference, as well as controls ("<" and ">") to let the host scroll to view other participants in the video conference.

Beneath the speaker view window 402 are a number of interactive elements 410-430 to allow the participant to interact with the video conference software. Controls 410-412 may allow the participant to toggle on or off audio or video streams captured by a microphone or camera connected to the client device. Control 420 allows the participant to view any other participants in the video conference with the participant, while control 422 allows the participant to send text messages to other participants, whether to specific participants or to the entire meeting. Control 424 allows the participant to share content from their client device. Control 426 allows the participant toggle recording of the meeting, and control 428 allows the user to select an option to join a breakout room. Control 430 allows a user to launch an app within the video conferencing software, such as to access content to share with other participants in the video conference.

In addition to controls 430, on the right side of the GUI 400 is a query window 440 within which the user may enter a question for the LLM 314, 382, and receive a response. Over the course of the meeting, the user may enter multiple questions, some of which may follow-up questions to earlier questions, while others may be related to entirely new topics. The client software 332 may process each question to generate a query as will be discussed in more detail below.

Figure 5:
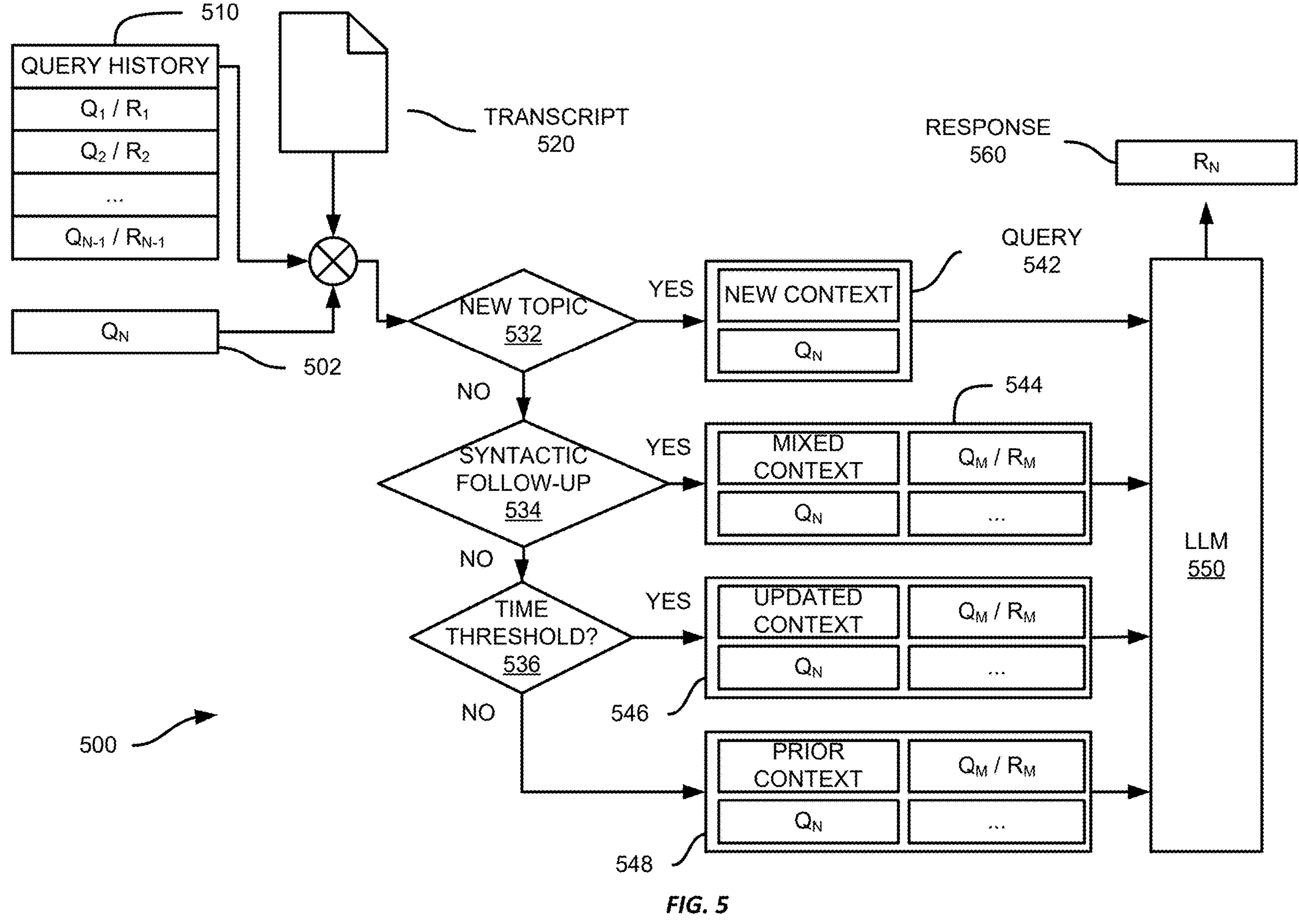
FIG. 5-8 show example process flows for follow-up queries for LLMs during virtual conferences.

Referring now to FIG. 5, FIG. 5 shows an example process flow 500 for follow-up queries for LLMs during virtual conferences. The process flow 500 will be discussed with respect to the example system discussed above with respect to FIGS. 3A-3B, but any suitable system according to this disclosure may be employed.

The process flow begins when a new question 502 is entered into the GUI 356. As discussed above, the user may type, speak, select one or more pre-defined questions, or otherwise enter a question into the GUI 356. The query service 352 receives the question 502 and obtains prior queries (including the questions, responses, and associated context) from a query history 510. In addition, as discussed above, it requests a transcript 520 from the virtual conference provider 310. The query service 352 employs an embedding service 354 to generate embeddings based on the transcript and one or more of the question or the prior query(ies) and response(s). It also determines whether the question 502 represents a new topic as compared to any prior questions in the query history 510 or whether it is a follow-up question to a prior query.

To do so, the query service 352 employs a trained ML model to determine whether any prior questions have one or more keywords in common with the new question 502. If not, the query service determines whether the new question is semantically related to any prior queries. If not, the query service 352 determines that the question 502 represents a new topic 532.

Figure 6:
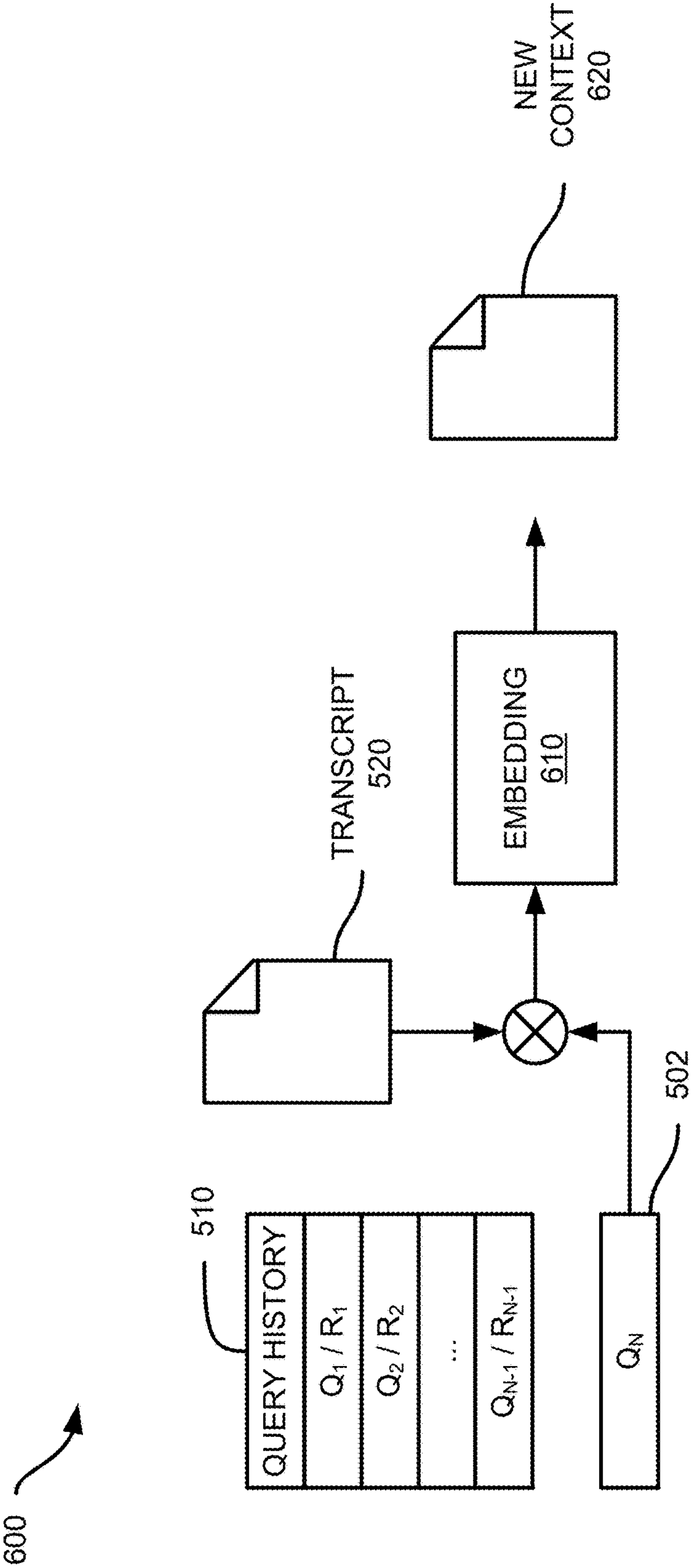

Referring now to FIG. 6, FIG. 6 illustrates the process flow 600 for generating a context 620 for a question 502 that introduces a new topic 532. Since the question 502 has been determined to be for a new topic, i.e., no relationship with any prior queries in the query history 510 has been identified, the query service 352 provides the transcript and the question to the embedding service 354, which employs an AI model to generate embeddings 610 based only on the transcript 520 and the question 510. It then uses the embeddings to identify portions of the transcript that are related to the question, which represents the relevant portions of the transcript for the question 502. Those portions of the transcript embedding are then output as the context for the query 542.

Referring again to FIG. 5, the query service 352 generates a query 542 that includes the question 502 and context 610 based on the transcript embedding. The query 542 is then provided to the LLM 550, which outputs a response 560 that is transmitted to the client software 332. The client software 332 outputs the response 560 within the GUI 356 as discussed above, and also stores the response with the query 542 in the query history 510.

However, if the query service 352 determines that the question 502 is syntactically related to one or more prior queries, it determines that the question 502 is a syntactic follow-up to the prior query(ies) and generates a query 544.

Figure 7:
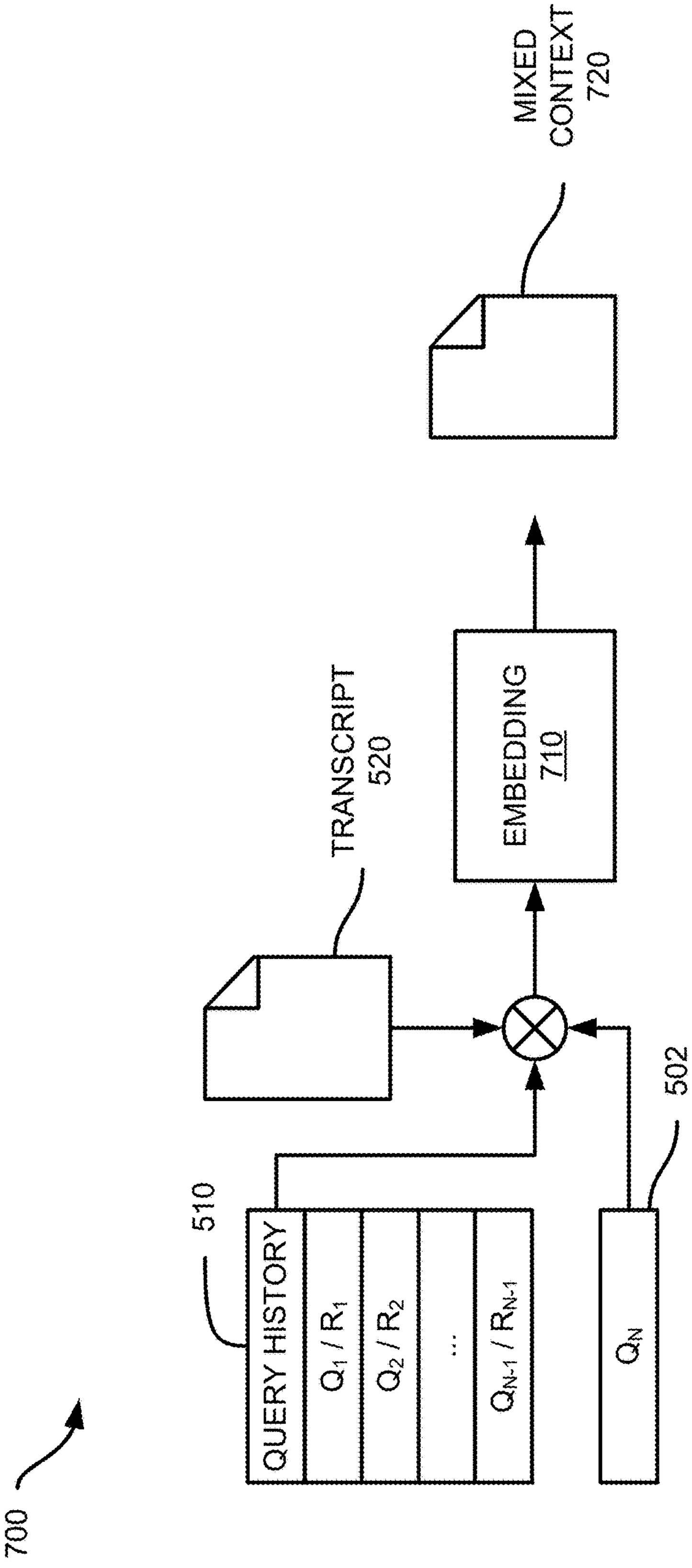

Referring to FIG. 7, FIG. 7 illustrates an example process flow 700 for follow-up queries for LLMs during virtual conferences. In this example, the question 502 has a syntactic relationship with one or more prior queries or responses stored in the query history 510. The query service 352 identifies the one or more prior queries or responses and determines which should be used to generate a suitable context for the query. In some examples, the query service 352 may identify all prior queries or responses that are syntactically related to the question 502. Other examples may only identify the most recent query or response that is syntactically related to the question 502. Other strategies include selecting prior queries or responses within a threshold amount of time preceding the question 502 or may impose a numerical limit on the number of prior queries or responses that may be selected, e.g., three. Some examples may only include the earliest question and the most recent that are syntactically related to the question. 502. Still further strategies may be employed in other examples.

After identifying relevant prior queries and responses from the query history 510, the question 502, the identified prior queries and corresponding responses (or identified responses and corresponding prior queries), and the transcript 520 are provided to the embedding service 354, which generates embeddings 710 that are used to identify portions of the transcript relevant to the question 502 as well as the prior queries and responses. These relevant portions of the transcript embedding 710 are then provided as "mixed" context 720, indicating that the context is a mixture of context relevant to the prior queries and responses as well as to the question 502.

Referring again to FIG. 5, the query service 352 generates a query 544 that includes the question 502, the mixed context 720, and the related query(ies) and associated responses, as discussed above with respect to FIG. 7. The query 544 is then provided to the LLM 550, which outputs a response 560 that is transmitted to the client software 332. The client software 332 outputs the response 560 within the GUI 356 as discussed above, and also stores the response with the query 542 in the query history 510.

Finally, if the query service 352 determines that the question 502 is semantically related to one or more prior queries, it determines that the question 502 is a semantic follow-up to the prior query(ies) and generates a query 546, 548 based on a time threshold and a time difference between the question 502 and a semantically related query or response.

Figure 8:
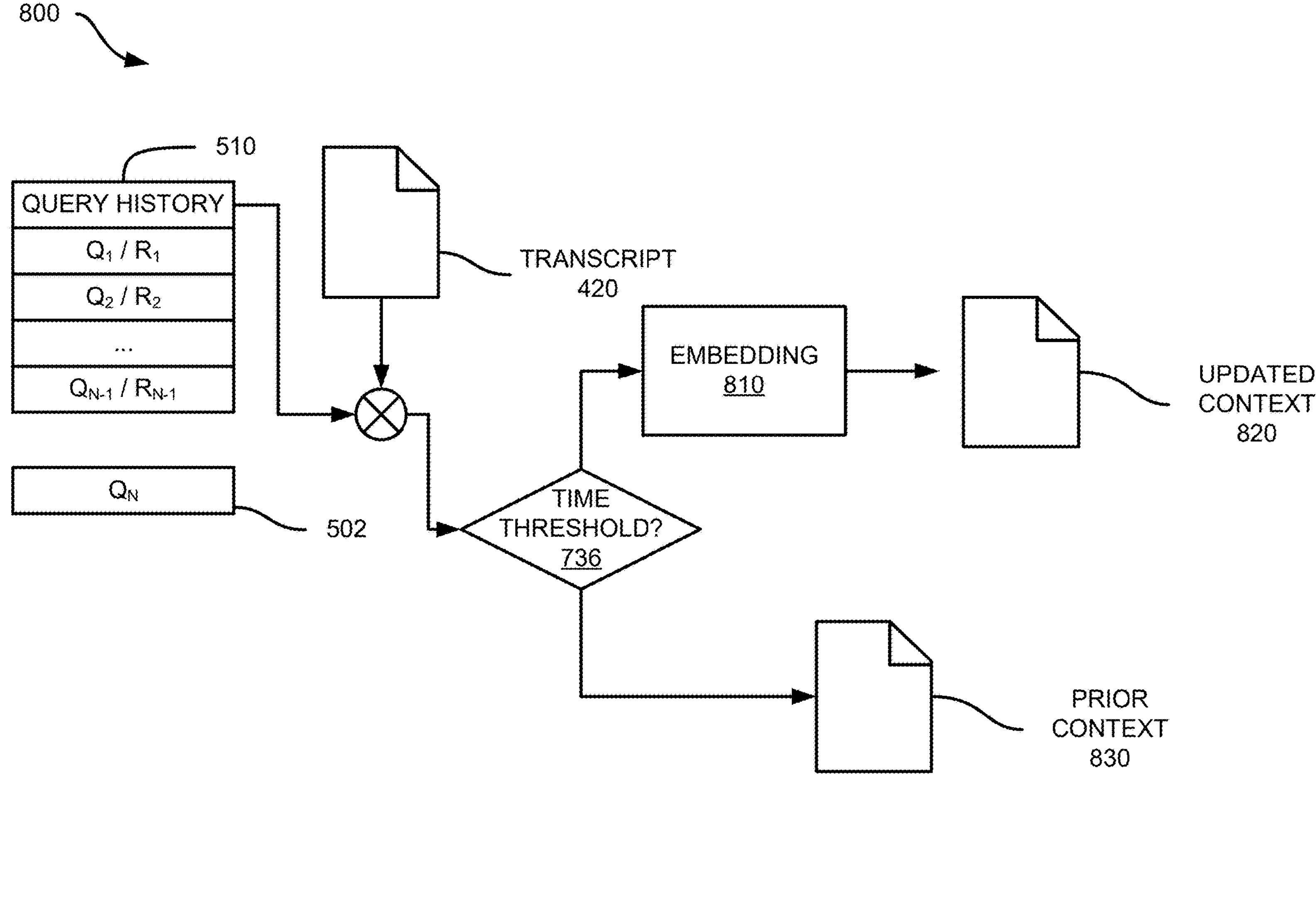

Referring now to FIG. 8, FIG. 8 illustrates an example process flow 800 for follow-up queries for LLMs during virtual conferences. In this example, the question 502 has a semantic relationship with one or more prior queries or responses stored in the query history 510. The query service 352 then identifies the one or more relevant prior queries or responses and determines which should be used to generate a suitable context for the query. In some examples, the query service 352 may identify all prior queries or responses that are syntactically related to the question 502. Other examples may only identify the most recent query or response that is syntactically related to the question 502. Other strategies include selecting prior queries or responses within a threshold amount of time preceding the question 502 or may impose a numerical limit on the number of prior queries or responses that may be selected, e.g., three. Some examples may only include the earliest question and the most recent that are semantically related to the question. 502. Still further strategies may be employed in other examples.

After identifying prior queries and responses from the query history 510, the question 502, the query service 352 determines an elapsed time between the most recent semantically related query and the question 502. If the elapsed time satisfies a threshold, the transcript 520 and the identified prior queries and responses, but not the question 502, are provided to the embedding service 354, which generates embeddings 810 based on the prior queries and responses. In this case, enough time has elapsed that additional discussion during the meeting may be useful for a subsequent question. The transcript embedding 810 is then analyzed to identify similarities to the prior queries and responses. Those portions of the transcript embedding 810 are then output as the updated context 820. However, if the elapsed time threshold is not satisfied, the context from a prior semantically related query, e.g., the most recent such query, is simply reused and is output as prior context 830. The elapsed time threshold may be set to any suitable value, such as 30 or 60 seconds, after which it is increasingly likely that additional discussion contributes to the subject matter of the question 502.

Referring again to FIG. 5, the query service 352 generates a query 546 or 548, depending on the context provided by the process flow 800 in FIG. 8. The query will include the context 820, 830 generated by the query service, the question 502, and the related query(ies) and associated responses, as discussed above with respect to FIG. 8. The query 546, 548 is then provided to the LLM 550, which outputs a response 560 that is transmitted to the client software 332. The client software 332 outputs the response 560 within the GUI 356 as discussed above, and also stores the response with the query 542 in the query history 510.

It should be appreciated that in the examples discussed above, a distinction was made between syntactic and semantic relationships to prior queries. This distinction has been used in this example as a way to separate scenarios where a follow-up question is likely to only require the contextual information used for a prior query, or whether additional contextual information may be needed. As discussed above, in some cases, contextual information from a prior query may be reused for a follow-up question without modification, while other follow-up scenarios may involve providing additional contextual information. The syntactic/semantic distinction discussed above is one approach for determining whether additional contextual information may be needed; however, other techniques may be employed as well. For example, particular types of questions may be identified as either requiring additional contextual information or not. For example, questions such as "can you tell me more about that?" may not require additional contextual information because it is seeking elaboration on the previously submitted contextual information. In contrast, questions that invoke names or groups of people may require additional contextual information for the named people or groups of people, rather than the person or topic that was originally addressed. And still further techniques may be employed as well.

Figure 9:
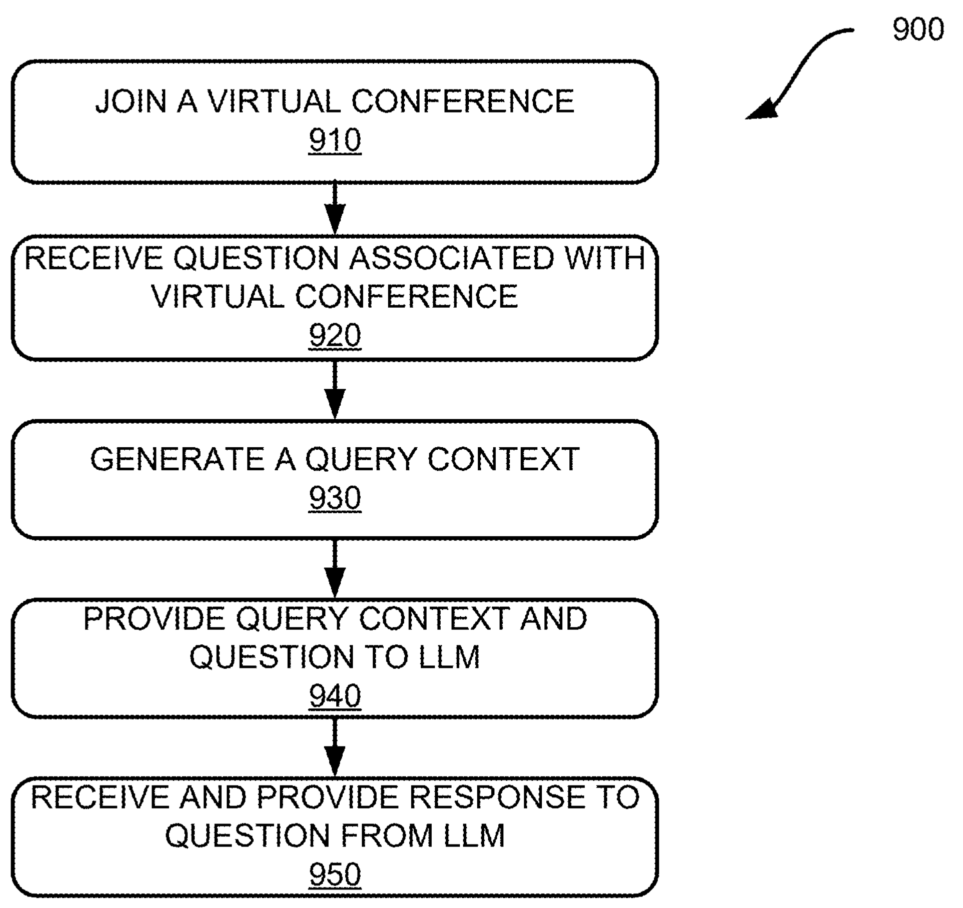
FIG. 9 shows an example method for follow-up queries for LLMs during virtual conferences.

Referring now to FIG. 9, FIG. 9 shows an example method 900 for follow-up queries for LLMs during virtual conferences. The example method 900 will be described with respect to the system 300 shown in FIGS. 3A-3B as well as the flow diagrams shown in FIGS. 5-8; however, it should be appreciated that any suitable systems or flows according to this disclosure may be employed.

At block 910, the client device 330 joins a virtual conference. In this example, the client device 330 executes client software 332, which communicates with the virtual conference provider 310 and joins a virtual conference hosted by the virtual conference provider 310, generally as described above with respect to FIGS. 1-2.

At block 920, the client device 330 receives a question associated with the virtual conference. In this example, the client software 332 receives the question as a text entry into a GUI 356, 400 presented by the client device 330. In some examples, the question may be spoken aloud and received by a microphone connected to the client device 330. The speech may then be converted to text using ASR, e.g., by the client software 332, and entered into the query window 440 provided in the GUI 356, 400.

At block 930, the client device 330 generates a query context based on a transcript of the virtual conference 310. As discussed above, the client software 332 employs a query service 352 to request and obtain a transcript 360 from the virtual conference provider 310. It then determines whether the question poses a new topic 532, is syntactically related to one or more prior queries or responses 534, or is semantically related to one or more prior queries or responses. Based on these determinations it generates a query context based on a corresponding process flow, such as those discussed above with respect to FIGS. 5-8. For example, if the query service 352 determines that the question 502 relates to a new topic 532, the query service 352 may generate a query context generally as described above with respect to FIGS. 5 and 6. If the query service 352 determines that the question 502 is syntactically related to one or more prior queries or responses, the query service 352 may generate a query context generally as described above with respect to FIGS. 5 and 7. Finally, if the query service 352 determines that the question 502 is semantically related to one or more prior queries or responses, the query service 352 may generate a query context generally as described above with respect to FIGS. 5 and 8.

At block 940, the client device 330 provides the query context and the question 502 to a trained LLM 314, 382 as a query. As discussed above with respect to FIGS. 5-8, the client device 330 may also provide one or more prior queries and responses, depending on which process flow was used to generate the query context. In this example, the query is provided to the LLM 314 hosted by the virtual conference provider 310; however, it should be appreciated that any LLM 314, 382, whether hosted by the virtual conference provider 310 or another remote server 380, may be employed.

At block 950, the client device 330 receives a response to the query from the LLM 314, 382. The client device 330 may then display the response within the GUI 356, 400, such as within the query panel 440. The query and response are then stored within the query history 510 and may be used to generate query contexts for subsequent questions.

Figure 10:
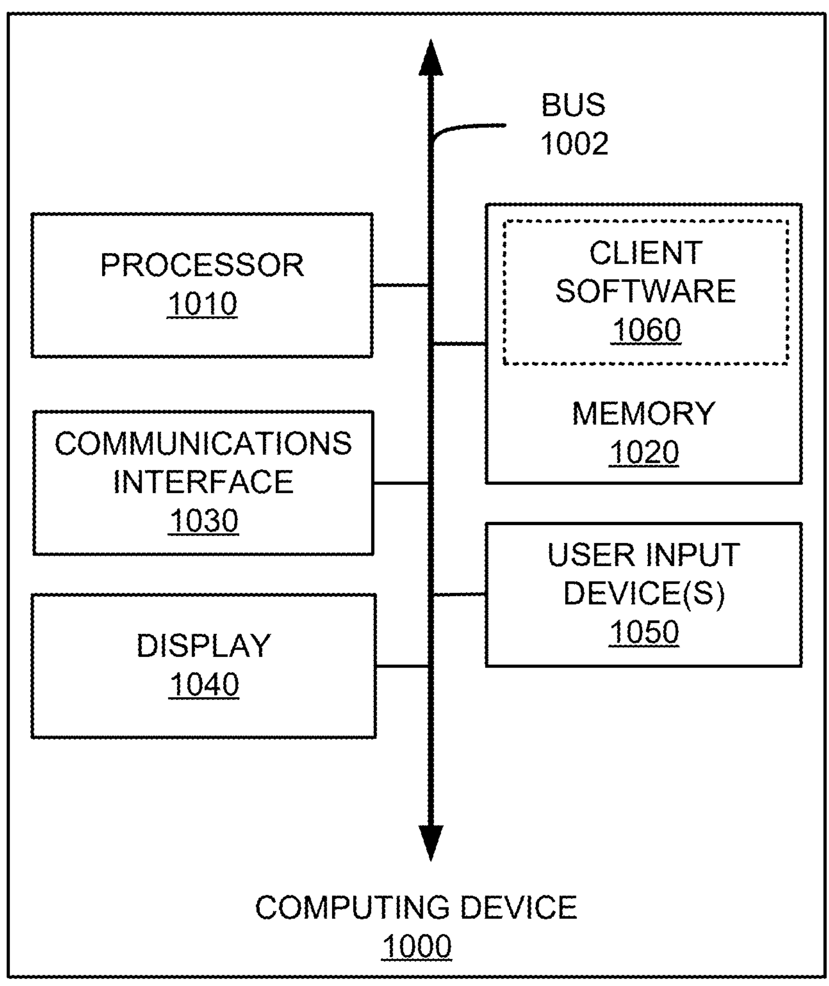
FIG. 10 shows an example computing device suitable for use with example systems and methods for follow-up queries for LLMs during virtual conferences.

Referring now to FIG. 10, FIG. 10 shows an example computing device 1000 suitable for use in example systems or methods for follow-up queries for LLMs during virtual conferences according to this disclosure. The example computing device 1000 includes a processor 1010 which is in communication with the memory 1020 and other components of the computing device 1000 using one or more communications buses 1002. The processor 1010 is configured to execute processor-executable instructions stored in the memory 1020 to perform one or more methods for follow-up queries for LLMs during virtual conferences according to different examples, such as part or all of the example method 900 described above with respect to FIG. 9. Suitable example computing devices 1000, such as user client devices, may also include one or more user input devices 1050, such as a keyboard, mouse, touchscreen, microphone, etc., to accept user input. The computing device 1000 also includes a display 1040 to provide visual output to a user. In addition, the computing device 1000 includes client software 1060, such as discussed above with respect to FIGS. 3-9.

The computing device 1000 also includes a communications interface 1040. In some examples, the communications interface 1030 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:

receiving, by a client application during a virtual conference, a question about a portion of a real-time transcript of the virtual conference, the virtual conference hosted by a virtual conference provider, a plurality of participants attending the virtual conference;

determining, by the client application, whether a related question was previously received by the client application during the virtual conference;

generating a query context based on the real-time transcript of the virtual conference;

providing the query context and the question to a trained large language model ("LLM"); and receiving, during the virtual conference, a response from the LLM based on the question and the query context.

2. The method of claim 1, further comprising storing the question and the response in a query history.

3. The method of claim 1, wherein generating the query context is further based on at least one prior query and a corresponding response.

4. The method of claim 1, further comprising:

determining a relationship between the question and at least one prior query in a query history; and wherein generating the query context is further based on the at least one prior query and a corresponding response.

5. The method of claim 4, wherein determining the relationship comprises determining a syntactic relationship between the question and the at least one prior query.

6. The method of claim 4, wherein determining the relationship comprises determining a semantic relationship between the question and the at least one prior query.

7. The method of claim 4, wherein determining the relationship comprises:

determining a semantic relationship between the question and the at least one prior query; and in response to determining a threshold elapsed time between the question and the at least one prior query has not been satisfied, generating the query context comprises re-using a prior context associated with the at least one prior query.

8. The method of claim 1, further comprising generating an embedding based on the real-time transcript, and wherein generating the query context is based on the embedding.

9. A system comprising:

a communications interface;

a non-transitory computer-readable medium; and one or more processors configured to execute processor-executable instructions stored in the non-transitory computer-readable medium to:

receive a question about a portion of a real-time transcript of a virtual conference, the virtual conference hosted by a virtual conference provider, a plurality of participants attending the virtual conference;

determine whether a related question was previously received during the virtual conference;

receive, during the virtual conference, a question about a portion of a real-time transcript of the virtual conference;

generate a query context based on the real-time transcript of the virtual conference;

provide the query context and the question to a trained large language model ("LLM"); and receive, during the virtual conference, a response from the LLM based on the question and the query context.

10. The system of claim 9, wherein the one or more processors are configured to execute further processor-executable instructions stored in the non-transitory computer-readable medium to store the question and the response in a query history.

11. The system of claim 9, wherein generating the query context is further based on at least one prior query and a corresponding response.

12. The system of claim 9, wherein the one or more processors are configured to execute further processor-executable instructions stored in the non-transitory computer-readable medium to:

determine a relationship between the question and at least one prior query in a query history; and wherein generating the query context is further based on the at least one prior query and a corresponding response.

13. The system of claim 12, wherein the one or more processors are configured to execute further processor-executable instructions stored in the non-transitory computer-readable medium to determine a syntactic relationship between the question and the at least one prior query.

14. The system of claim 12, wherein the one or more processors are configured to execute further processor-executable instructions stored in the non-transitory computer-readable medium to determining a semantic relationship between the question and the at least one prior query.

15. The system of claim 12, wherein the one or more processors are configured to execute further processor-executable instructions stored in the non-transitory computer-readable medium to:

determine a semantic relationship between the question and the at least one prior query; and in response to determining a threshold elapsed time between the question and the at least one prior query has not been satisfied, generate the query context comprises re-using a prior context associated with the at least one prior query.

16. The system of claim 9, wherein the one or more processors are configured to execute further processor-executable instructions stored in the non-transitory computer-readable medium to generate an embedding based on the real-time transcript, and wherein generating the query context is based on the embedding.

17. A non-transitory computer-readable medium comprising processor-executable instructions configured to cause one or more processors to:

receive, during a virtual conference, a question about a portion of a real-time transcript of the virtual conference, the virtual conference hosted by a virtual conference provider, a plurality of participants attending the virtual conference;

determine whether a related question was previously received during the virtual conference;

generate a query context based on the real-time transcript of the virtual conference;

provide the query context and the question to a trained large language model ("LLM"); and receive, during the virtual conference, a response from the LLM based on the question and the query context.

18. The non-transitory computer-readable medium of claim 17, wherein generating the query context is further based on at least one prior query and a corresponding response.

19. The non-transitory computer-readable medium of claim 17, further comprising processor-executable instructions configured to cause the one or more processors to:

determine a relationship between the question and at least one prior query in a query history; and wherein generating the query context is further based on the at least one prior query and a corresponding response.

20. The non-transitory computer-readable medium of claim 19, further comprising processor-executable instructions configured to cause the one or more processors to:

determine a semantic relationship between the question and the at least one prior query; and in response to determining a threshold elapsed time between the question and the at least one prior query has not been satisfied, generate the query context comprises re-using a prior context associated with the at least one prior query.

* * * * *